United States Patent
Liu

(10) Patent No.: US 10,008,114 B2
(45) Date of Patent: Jun. 26, 2018

(54) VEHICLE SEARCHING SYSTEM AND METHOD FOR SEARCHING VEHICLE

(71) Applicant: ALi Corporation, Hsinchu (TW)

(72) Inventor: Li-Bing Liu, Shanghai (CN)

(73) Assignee: ALi Corporation, Hsinchu (TW)

( * ) Notice: Subject to any disclaimer, the term of this patent is extended or adjusted under 35 U.S.C. 154(b) by 334 days.

(21) Appl. No.: 14/962,255

(22) Filed: Dec. 8, 2015

(65) Prior Publication Data

US 2017/0092128 A1    Mar. 30, 2017

(30) Foreign Application Priority Data

Sep. 24, 2015   (CN) .......................... 2015 1 0615133

(51) Int. Cl.
| | |
|---|---|
| G08G 1/123 | (2006.01) |
| G08G 1/127 | (2006.01) |
| G08G 1/005 | (2006.01) |
| G08G 1/00 | (2006.01) |
| G06K 9/00 | (2006.01) |

(52) U.S. Cl.
CPC ......... *G08G 1/127* (2013.01); *G06K 9/00771* (2013.01); *G08G 1/005* (2013.01); *G08G 1/205* (2013.01)

(58) Field of Classification Search
CPC ................... H04N 1/00; G06F 1/00
See application file for complete search history.

(56) References Cited

U.S. PATENT DOCUMENTS

| | | | |
|---|---|---|---|
| 2011/0060496 A1* | 3/2011 | Nielsen .............. | G06Q 10/0631 701/31.4 |
| 2014/0028477 A1 | 1/2014 | Michalske | |
| 2015/0360613 A1* | 12/2015 | Lee .......................... | G06K 9/18 348/148 |

FOREIGN PATENT DOCUMENTS

TW    I465357    12/2014

\* cited by examiner

*Primary Examiner* — Shirley Lu
(74) *Attorney, Agent, or Firm* — J.C. Patents

(57) ABSTRACT

A vehicle searching system and a method for searching a vehicle are provided. The vehicle searching system includes a vehicle electronic device, a data storage device and a mobile device. The vehicle electronic device captures images along a moving direction of the vehicle, and provides a positioning information of the vehicle and determines whether the vehicle sends a parking stall signal. The data storage device stores data. The mobile device communicates with the data storage device. The vehicle electronic device receives the parking stall signal to select a parking image from the images and obtain positioning information of the vehicle, and transmits the parking image and the positioning information to the data storage device. The mobile device obtains the parking image and the positioning information from the data storage device, and displays the parking image and presents the positioning information in a graphical interface.

12 Claims, 6 Drawing Sheets

VEHICLE SEARCHING SYSTEM AND METHOD FOR SEARCHING VEHICLE

CROSS-REFERENCE TO RELATED APPLICATION

This application claims the priority benefit of China application serial no. 201510615133.4, filed on Sep. 24, 2015. The entirety of the above-mentioned patent application is hereby incorporated by reference herein and made a part of this specification.

BACKGROUND OF THE INVENTION

Field of the Invention

The invention relates to a vehicle searching technique, and particularly relates to a vehicle searching system and a method for searching a vehicle.

Description of Related Art

When a user want to pick up a vehicle from a parking lot, the user generally searches a parking space where the vehicle is parked according to an original memory on the parking lot. The driver may forget a parking location of the vehicle or is not easy to find the location of the parked vehicle. If the vehicle is not parked by the user himself, it may be more difficult to find the vehicle.

Therefore, how to assist the driver to accurately search a vehicle parking location with assistance of technology or assist the driver to quickly identify a vehicle parking region is still a problem to be resolved.

SUMMARY OF THE INVENTION

The invention is directed to a vehicle searching system and a method for searching vehicle, by which a user is able to conveniently and quickly identify a vehicle parking region and a vehicle parking location, so as to save a time and labor of the user for searching a vehicle.

The invention provides a vehicle searching system including a vehicle electronic device, a data storage device and a mobile device. The vehicle electronic device is configured to capture a plurality of images along a moving direction of a vehicle, and provide a positioning information of the vehicle and determine whether the vehicle sends a parking stall signal. The data storage device communicates with the vehicle electronic device and is configured to store data. The mobile device communicates with the data storage device. The vehicle electronic device receives the parking stall signal to select a parking image from the images and obtain positioning information of the vehicle, and transmits the parking image and the positioning information to the data storage device for storage. The mobile device obtains the parking image and the positioning information from the data storage device, and displays the parking image and presents the positioning information in a graphical interface.

According to another aspect, the invention provides a method for searching a vehicle. The method for searching the vehicle includes following steps. A plurality of images along a moving direction of the vehicle is continuously captured when the vehicle is started and moves. At least one parking image is selected from the images and positioning information of the vehicle is obtained when the vehicle is stalled, and the at least one parking image and the positioning information are transmitted and stored to a data storage device. A mobile device obtains the at least one parking image and the positioning information from the data storage device, and the mobile device displays the at least one parking image and presents the positioning information in a graphical interface.

According to the above description, according to the vehicle searching system and the method for searching the vehicle of the invention, When the user wants to find the vehicle, the user may use the mobile device to communicate with the data storage device to obtain and presents the positioning information and the parking record images in a graphical interface. In this way, the user may conveniently and quickly identify the vehicle parking region to find the vehicle parking location, so as to save a time and labor of the user for finding the vehicle.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
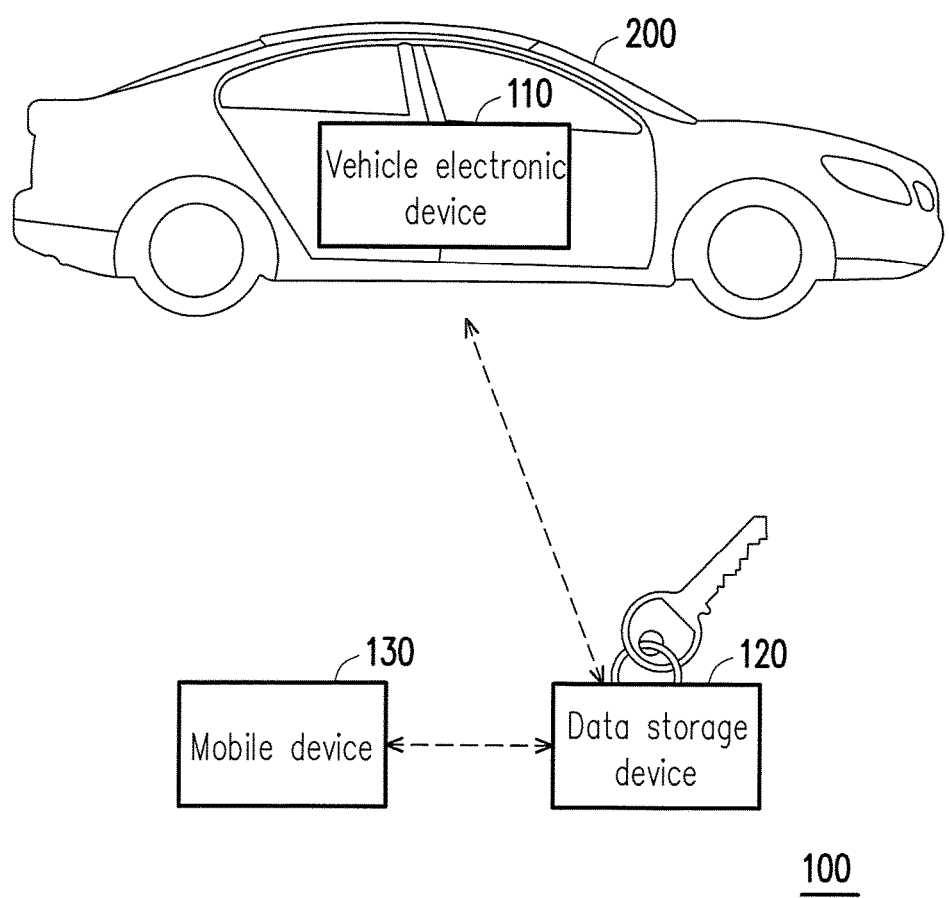
FIG. 1 is a schematic diagram of a vehicle searching system according to an embodiment of the invention.

In order to assist a user/driver to easily search a parked vehicle with assistance of technology, in the invention, besides positioning information is obtained when the vehicle is stalled and parked, images related to a vehicle parking location are also automatically captured to assist the user to identify a vehicle parking environment. Referring to FIG. 1, the vehicle searching system 100 includes a vehicle electronic device 110, a data storage device 120 and a mobile device 130. The vehicle electronic device 110 is disposed on a vehicle 200. In the present embodiment, the vehicle electronic device 110 can be an integral device integrating a vehicle electronic control device and a vehicle-mounted electronic device (for example, a vehicle-mounted machine, a video event data recorder, a navigation device, an audio and video play system, a vehicle reversing aid system) by integrating a plurality of vehicle control techniques (for example, an engine power control technique, a sensor image control technique, an electromechanical control technique). The vehicle electronic device 110 of the present embodiment at least have a driving event data record function, a navigation function and a corresponding function of obtaining a parking stall signal when the user want to stall the vehicle. In some embodiments, an independent video event data recorder, vehicle navigation device can be combined with the vehicle electronic control device through communication to implement the vehicle electronic device 110.

The data storage device 120 can be designed as a key of the vehicle 200 or an accessory hanging the key, which can be always carried by the user when the user wants to pick up the vehicle. The mobile device 130 can be a mobile electronic device such as a smart phone, a panel personal computer (PC) or a notebook, etc. A processor 132 may execute a map application to implement the embodiment of the invention, for example, an application software of a map software, a global positioning system (GPS) software, etc., which is not limited by the invention. The data storage device 120 can be paired to the vehicle electronic device 110 and the mobile device 130 in a short distance for communication. In the present embodiment, communication between the vehicle electronic device 110, the data storage device 120 and the mobile device 130 can be implemented through WiMAX, a 3G network, a 4G network or a wireless local area network (LAN) protocol such as an infrared (IR) communication protocol, a WiFi protocol, a bluetooth communication protocol, etc., which is not limited by the invention. If the data storage device 120 adopts the bluetooth technique to communicate with the other two devices, before the vehicle searching system 100 operates, the data storage device 120 is required to respectively perform bluetooth pairing with the vehicle electronic device 110 and the mobile device 130 to implement communication.

When the user drives the vehicle, the driving event data record function of the vehicle electronic device 110 can automatically capture driving record images or a plurality of images along a moving direction of the vehicle 200 to serve as data evidence in case of a car accident or serve for other usages. The navigation function of the vehicle electronic device 110 may continuously receive GPS signals, and combine the GPS signal with map data to provide positioning information of a current location of the vehicle 200, so as to guide a moving direction.

Particularly, when the driver wants to park the vehicle, the driver stops the engine to generate the parking stall signal. The vehicle electronic device 110 continuously determines whether the vehicle 200 sends the parking stall signal, so as to determine whether the driver has parked the vehicle. Therefore, when the user has parked the vehicle 200 and stops the engine, the vehicle electronic device 110 receives the parking stall signal, and selects one or a plurality of images from the images (i.e. a plurality of images captured along a moving direction of the vehicle 200) obtained through the driving event data record function of the vehicle electronic device 100 to serve as parking images. On the other hand, after receiving the parking stall signal, the vehicle electronic device 110 obtains positioning information (for example, the GPS signal) of the vehicle 200 through the navigation function thereof. Then, the vehicle electronic device 110 transmits the selected parking images and the positioning information of the vehicle 200 to the data storage device 120. In this way, the data storage device 120 stores the parking images and the positioning information obtained when the vehicle 200 is stalled.

Figure 2:
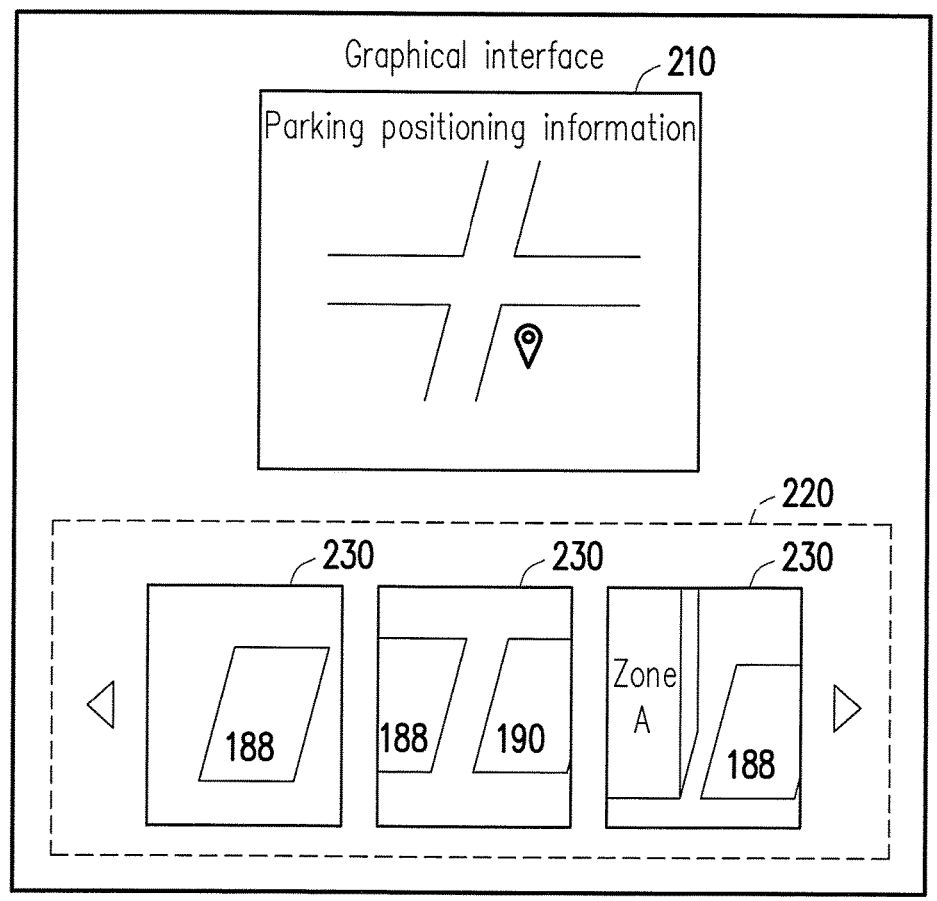
FIG. 2 is a schematic diagram illustrating a vehicle parking situation according to an embodiment of the invention.
Figure 3:
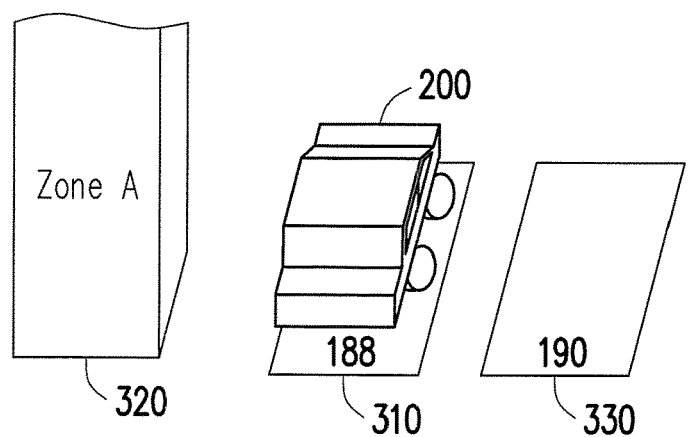
FIG. 3 is an example of images captured by a vehicle electronic device according to an embodiment of the invention.

When the user/driver wants to pick up the vehicle 200, the user may use the mobile device 130 to execute the map application or function of the embodiment of the invention. Then, the mobile device 130 communicates with the data storage device 120 to obtain the parking images and the positioning information. The mobile device 130 displays the parking images and presents the positioning information of the vehicle 200 in a graphical interface. Referring to FIG. 2 and FIG. 3, the graphical interface 200 may include a positioning information display block 210 and a parking image display block 220. The positioning information display block 210 displays a location of the vehicle 200 according to map data and the positioning information, though due to factors of map fineness and accuracy of the GPS positioning information, the user is probably hard to search the parking location of the vehicle 200 only according to the positioning information. One or a plurality of parking images 230 in the parking image display block 220 may present one or a plurality of parking images 230 captured within a predetermined period before the vehicle 200 is stalled, such that the user may search the vehicle 200 according to the scenery or the environment presented by the parking images 230. For example, the vehicle 200 of FIG. 3 is parked in a parking space 310 with a referential number "188", and a post 320 with a notice board writing "zone A" and a parking space 330 with a referential number "190" are located next to the parking space 310. Since the number of the parking images 230 is probably plural, scroll buttons respectively with a shape of a triangle are respectively set at two sides of the parking image display block 220 to facilitate selecting or scrolling the parking images 230.

Particularly, since the communication method between the mobile device 130 and the data storage device 120 of the embodiment of the invention belongs to a short-distance local area wireless transmission type, when the distance between the mobile device 130 and the data storage device 120 is too far, the mobile device 130 cannot obtain corresponding information. Now, since the data storage device 120 of the invention is implemented through a key of the vehicle 200, a key holding portion or a key accessory, etc., the mobile device 130 may present a notification of "vehicle key is not in the vicinity" or other notification to remind the user. Such method can also serve as a method for searching the vehicle key.

Figure 4:
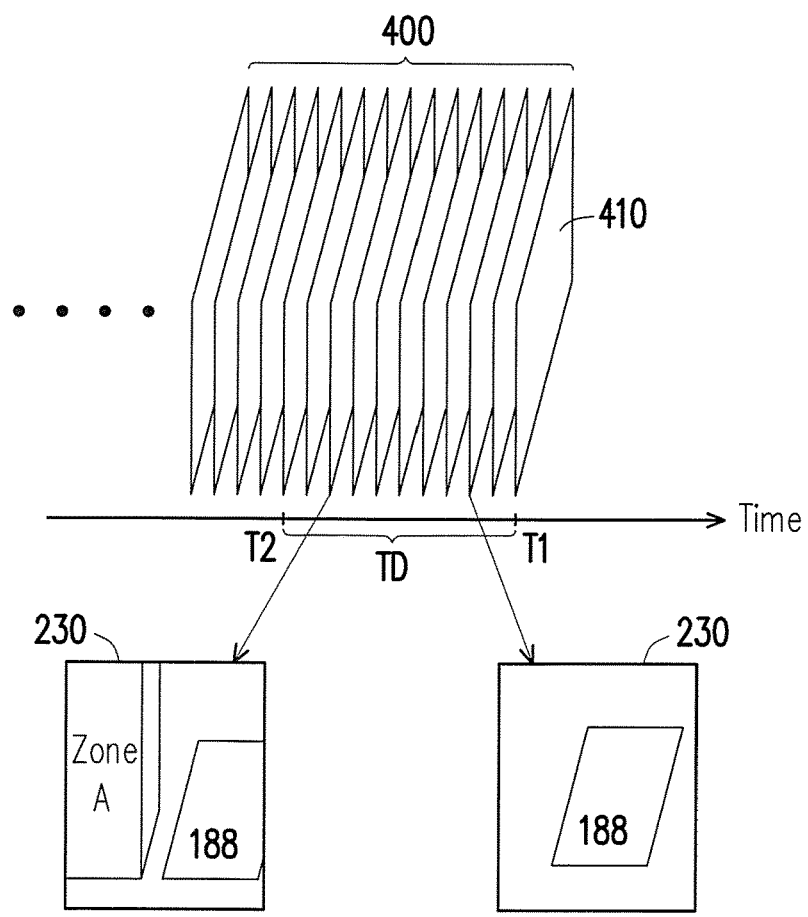
FIG. 4 is a schematic diagram of a data storage device according to an embodiment of the invention.

Referring to FIG. 4, the driving record images 400 are a plurality of images arranged along a time axis, and a time point T1 is a time point when the vehicle electronic device receives the parking stall signal. When the vehicle is parked and stalled, a last image (i.e. an image 410 corresponding to the time point T1) in the driving record images is probably hard to obtain good environment information around the vehicle since the vehicle is probably parked by facing a monotonous scenery (for example, facing a wall). Therefore, in the embodiment of the invention, it is hoped to obtain the images generated before the parking stall from the driving record images 400 to serve as the parking images. In this way, when the vehicle electronic device receives the parking stall signal, the vehicle electronic device records the time point T1 when the parking stall signal is received, and counts backward by a predetermined period TD from the time point T1 to obtain a plurality of images from the driving record images 400 within the predetermined period TD (i.e. from the time point T1 to a time point T2). In the present embodiment, the vehicle electronic device may randomly select one or a plurality of the parking images 230 from the images within the predetermined period TD. In other embodiments complied with the spirit of the invention, the vehicle electronic device may determine whether the images captured within the predetermined period TD include a number or a text according to an image recognition technique, and selects the images with the number or the text to serve as the parking images 230. In this way, the images with a number or a text (for example, "zone A", "188" or "190") has higher environmental identifiability for the user, such that the user may obtain better information to quickly search the parking location of the vehicle. A time length of the predetermined period TD can be preset by the system or defined by the user. For example, the time length of the predetermined period TD can be set to 3 minutes, 5 minutes or 10 minutes, which is not limited by the invention.

Figure 5:
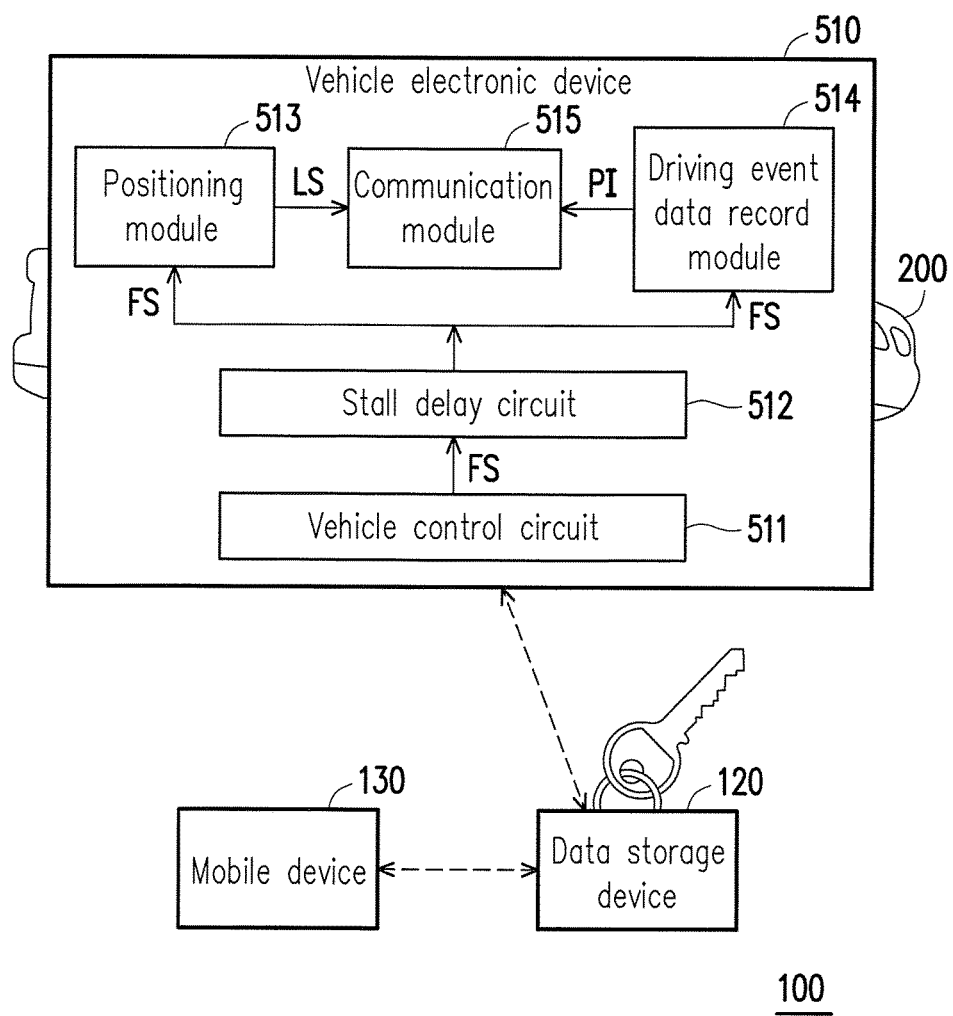
FIG. 5 is a schematic diagram of a mobile device e according to an embodiment of the invention.

Referring to FIG. 5, the vehicle electronic device 510 may include a vehicle control circuit 511, a positioning module 513 and a driving event data record module 514. In the present embodiment, the driving event data record module 514 and the positioning module 513 can be an integral device integrated to the vehicle electronic device. In other embodiments, the driving recode module 514 can be an independent driving event data recorder, and the positioning module 513 can be an independent vehicle navigation device, and the two modules may communicate with the vehicle control circuit 511 in the vehicle electronic device 510 through a communication protocol to achieve the functions of the embodiment of the invention.

The vehicle control circuit 511 send the parking stall signal FS when the vehicle 511 is stalled. In other words, the vehicle control circuit 511 determines whether the engine of the vehicle 200 is stalled to send a parking stall signal FS. The driving event data record module 514 captures a plurality of images along a moving direction of the vehicle 200 when the vehicle 200 is started, and the driving event data record module 514 selects one or a plurality of parking image from the driving record images for transmitting to the data storage device 120 when receiving the parking stall signal FS. In the present embodiment, the operation of selecting one or a plurality of parking images from the driving record images can be executed by the driving event data record module 514. On the other hand, the driving event data record module can transmit the driving record images to the vehicle control circuit 511, and the vehicle control circuit 511 executes the operation of selecting one or a plurality of parking images. The positioning module 513 provides positioning information LS of the vehicle 200 after receiving the parking stall signal FS, and transmits the positioning information LS to the data storage device 120.

The vehicle electronic device 510 may further includes a stall delay circuit 512 and a communication module 515. The communication module 515 can be a communication chip or a hardware structure complied with a corresponding communication protocol. The communication module 515 is coupled to the positioning module 513 and the driving event data record module 514. The communication module 515 is configured to transmit the parking images PI and the positioning information LS to the data storage device 120 in a wireless transmission manner. The stall delay circuit 512 is coupled to the positioning module 513 and the driving event data record module 514. The stall delay circuit 512 is configured to transmit the parking stall signal FS to the positioning module 513 and the driving event data record module 514. It should be noted that since some of the operations of the embodiment of the invention are performed after the vehicle engine is stalled, the stall delay circuit 512 is required to maintain a power of the vehicle electronic device 510 to complete the aforementioned operations when receiving the parking stalling signal FS.

When the user parks the vehicle 200, the vehicle control circuit 511 sends the parking stall signal FS. Then, the stall delay circuit 512 maintains the power of the vehicle electronic device 510, and transmits the parking stall signal FS to the positioning module 513 and the driving event data record module 514, and the driving event data record module 514 selects the parking images PI and records the positioning information LS of the driving event data record module 514. Then, the parking images PI and the positioning information LS are transmitted to the data storage device 520 through the communication module 515 in a wireless transmission manner. Finally, after the vehicle electronic device 110 completes the aforementioned data transmission, the stall delay circuit 512 stops supplying the power to the vehicle electronic device 110, so as to complete positioning of the vehicle 200 and image capturing of the ambient environment. When the user wants to search the parking location of the vehicle 200, the user may receive the parking images PI and the positioning information LS on the data storage device 120 through the mobile device 130, so as to search the parking location of the vehicle 200.

Figure 6:
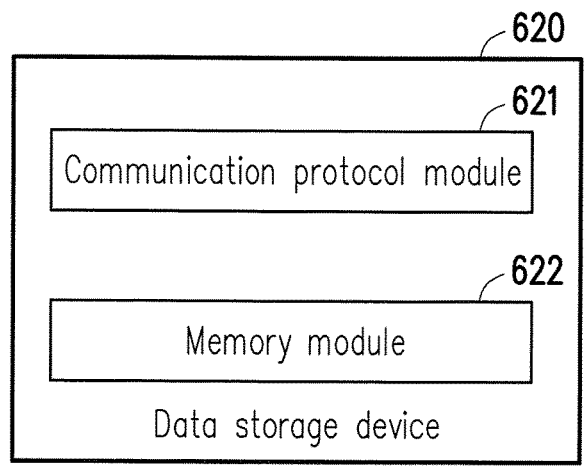
FIG. 6 is a schematic diagram of a vehicle searching system according to another embodiment of the invention.

Referring to FIG. 6, the data storage device 120 includes a communication protocol module 621 and a memory module 622. The communication protocol module 621 can be a communication chip or a hardware device complied with the corresponding communication protocol. The communication protocol module 621 of the present embodiment communicates with the vehicle electronic device 110 through a wireless local area network protocol, and is configured to receive the parking images and the positioning information of the vehicle 200. The memory module 622 is coupled to the communication protocol module 621, and is configured to store the received parking images and the positioning information of the vehicle 200. Since the data storage device 120 is only required to store several parking images and the positioning information of the vehicle 200, a storage capacity thereof can be relatively small, and it is unnecessary to use a memory with a large storage capacity to implement the data storage device 120. Therefore, the data storage device 120 can be disposed on the key, the key holding portion or the accessory thereof.

Figure 7:
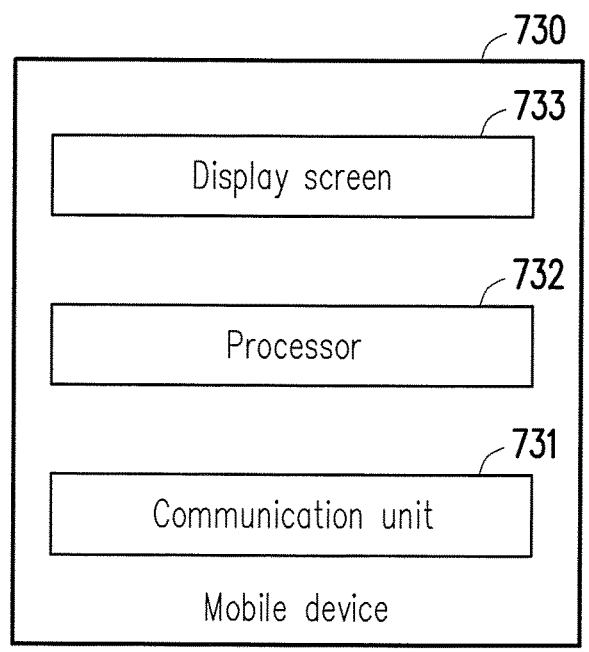
FIG. 7 is a schematic diagram of another vehicle electronic device according to another embodiment of the invention.

Referring to FIG. 7, the mobile device 130 includes a communication unit 731, a processor 732 and a display screen 733. The communication unit 731 can be a communication chip or a hardware device complied with the corresponding communication protocol. The communication unit 731 is paired to the data storage device 120 for communication, and is configured to receive the parking images and the positioning information of the vehicle 200. The processor 732 is coupled to the communication unit 731 and the display screen 733, and is configured to execute a map application or a corresponding function, and displays the parking images through the display unit 733 and presents the positioning information through a graphic interface according to the received parking images and the positioning information of the vehicle 200.

Figure 8:
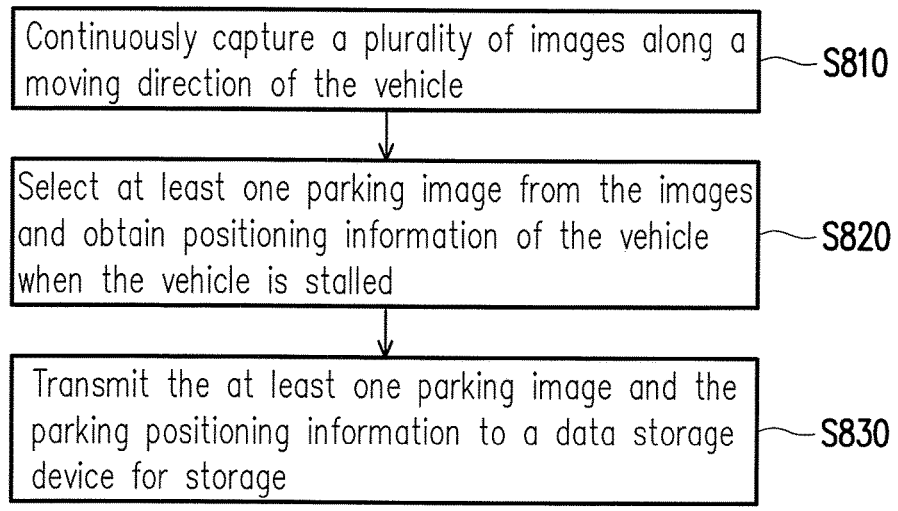
FIG. 8 is a flowchart illustrating a method for searching a vehicle according to an embodiment of the invention.

Referring to FIG. 1 and FIG. 8, the method for searching the vehicle of the present embodiment is, for example, at least adapted to the vehicle searching system 100 of FIG. 1. In step S810, when the vehicle 200 is started and moves, the vehicle electronic device 110 continuously captures a plurality of images along a moving direction of the vehicle 200. In step S820, when the vehicle 200 is stalled, the vehicle electronic device 110 selects at least one parking image from the captured images to serve as the parking images, and obtains the positioning information of the vehicle 200. In step S830, the vehicle electronic device 110 transmits the at least one parking image and the positioning information to a data storage device 120 for storage. Therefore, when the user parks the vehicle 200, the parking images and the positioning information of the vehicle 200 can be immediately stored in the data storage device 120.

Figure 9:
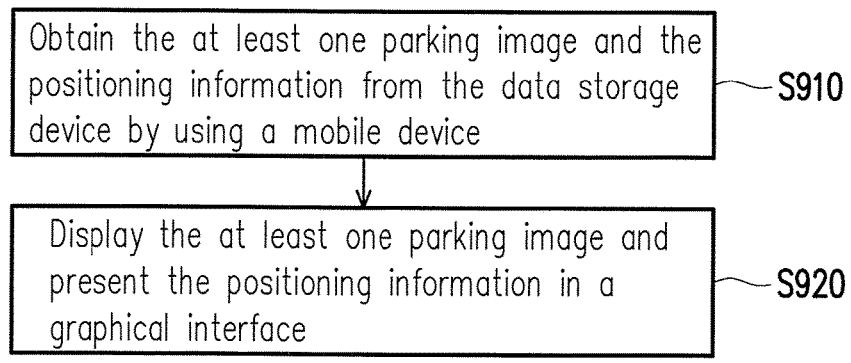
FIG. 9 is a flowchart illustrating a method for searching a vehicle by using a mobile device according to an embodiment of the invention.

The method for searching the vehicle by using the mobile device of the embodiment is, for example, at least adapted to the mobile device 130 of FIG. 1 or FIG. 7. Referring to FIG. 1 and FIG. 9, in step S910, the mobile device 130 obtains the parking images and the positioning information of the vehicle 200 from the data storage device 120 through a wireless local area network protocol. In step S920, the mobile device 130 displays the parking images through the display unit 133 and presents the positioning information of the vehicle 200 in a graphical interface. Therefore, in the present embodiment, when the user wants to search the parking location of the vehicle 200, the user may quickly search the parking location of the vehicle 200 through the parking images and the positioning information of the vehicle displayed by the mobile device 130.

In summary, according to the vehicle searching system and the method for searching the vehicle of the invention, the vehicle searching system uses the vehicle electronic device to provide a plurality of images related to the moving direction of the vehicle and the positioning information of the vehicle. When the user stalls and parks the vehicle, the vehicle electronic device may transmit the parking images related to the current parking location and the positioning information to the data storage device. Particularly, in the invention, the data storage device is designed to be adapted to receive the information transmitted by the vehicle electronic device, and is easy to be carried by the user. When the user wants to search the vehicle parking location, the user may use the carried mobile device to communicate with the carried data storage device, and use the mobile device to display the parking images and the positioning information. In this way, the user may quickly search the vehicle through the parking images and the positioning information of the vehicle displayed by the mobile device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A vehicle searching system, comprising:
a vehicle electronic device, capturing a plurality of images along a moving direction of a vehicle, and providing a positioning information of the vehicle and determining whether the vehicle sends a parking stall signal, wherein the vehicle electronic device also comprises
a driving event data record module, configured to capture the plurality of images along the moving direction of the vehicle,
a positioning module, configured to provide the positioning information of the vehicle, and
a vehicle control circuit, configured to send the parking stall signal when the vehicle is stalled;
a data storage device, communicating with the vehicle electronic device, and configured to store data, wherein the driving event data record module selects at least one parking image from the plurality of images for transmitting to the data storage device when receiving the parking stall signal, and the positioning module provides the positioning information of the vehicle to the data storage device when receiving the parking stall signal; and
a mobile device, communicating with the data storage device,
wherein the vehicle electronic device receives the parking stall signal to select the at least one parking image from the plurality of images and obtain the positioning information of the vehicle, and transmits the at least one parking image and the positioning information to the data storage device for storage, and
the mobile device obtains the at least one parking image and the positioning information from the data storage device, and displays the at least one parking image and presents the positioning information in a graphical interface.

2. The vehicle searching system as claimed in claim 1, wherein the data storage device is a key of the vehicle.

3. The vehicle searching system as claimed in claim 1, wherein the vehicle electronic device further comprises:
a stall delay circuit, coupled to the vehicle control circuit, the driving event data record module and the positioning module, and configured to receive the parking stall signal and transmit the parking stall signal to the driving event data record module and the positioning module, wherein the stall delay circuit maintains a power of the vehicle electronic device when receiving the parking stalling signal,
wherein after the driving event data record module and the positioning module respectively transmit the at least one parking image and the positioning information of the vehicle to the data storage device, the stall delay circuit stops supplying power to the vehicle electronic device.

4. The vehicle searching system as claimed in claim 1, wherein the driving event data record module is a video event data recorder (VEDR), and the positioning module is a vehicle navigation device, and the driving event data recorder and the vehicle navigation device respectively communicate with the data storage device through an inbuilt communication chip,
or the driving event data record module and the positioning module are integrated into an integral device.

5. The vehicle searching system as claimed in claim 1, wherein the vehicle electronic device determines whether the images captured within a predetermined period counted backward from a time point for obtaining the vehicle stall signal comprise a number or text, and selects the images having the number or the text to serve as the at least one parking image.

6. The vehicle searching system as claimed in claim 1, wherein the vehicle electronic device selects a plurality of the parking images from the images captured within a predetermined period counted backward from a time point for obtaining the vehicle stall signal in a random manner.

7. The vehicle searching system as claimed in claim 1, wherein the mobile device presents the positioning information through a map application.

8. The vehicle searching system as claimed in claim 1, wherein the vehicle electronic device, the data storage device and the mobile device communicate with each other through a wireless local area network protocol, and the wireless local area network protocol is one of a bluetooth communication protocol and a WiFi protocol.

9. The vehicle searching system as claimed in claim 1, wherein the data storage device comprises:
a communication protocol module, communicating with the vehicle electronic device through a wireless local area network protocol; and
a memory module, coupled to the communication protocol module for storing data.

10. The vehicle searching system as claimed in claim 1, wherein the mobile device is a smart phone, a tablet computer or a notebook.

11. A method for searching a vehicle, comprising:
- continuously capturing a plurality of images along a moving direction of the vehicle;
- selecting at least one parking image from the plurality of images captured within a predetermined period counted backward from a time point for obtaining a vehicle stall signal in a random manner and obtaining positioning information of the vehicle when the vehicle is stalled, and transmitting the at least one parking image and the positioning information to a data storage device for storage; and
- obtaining the at least one parking image and the positioning information from the data storage device by using a mobile device, and displaying the at least one parking image through the mobile device and presenting the positioning information in a graphical interface.

12. The method for searching the vehicle as claimed in claim 11, wherein the step of selecting the at least one parking image from the plurality of images further comprises:
- determining whether the images captured within the predetermined period counted backward from the time point for obtaining the vehicle stall signal comprise a number or text; and
- selecting the images having the number or the text to serve as the at least one parking image.

* * * * *